Mar. 6, 1923.
H. F. McCLAIN.
DUMPING TRUCK.
FILED JUNE 7, 1920.
1,447,590.
2 SHEETS—SHEET 1.
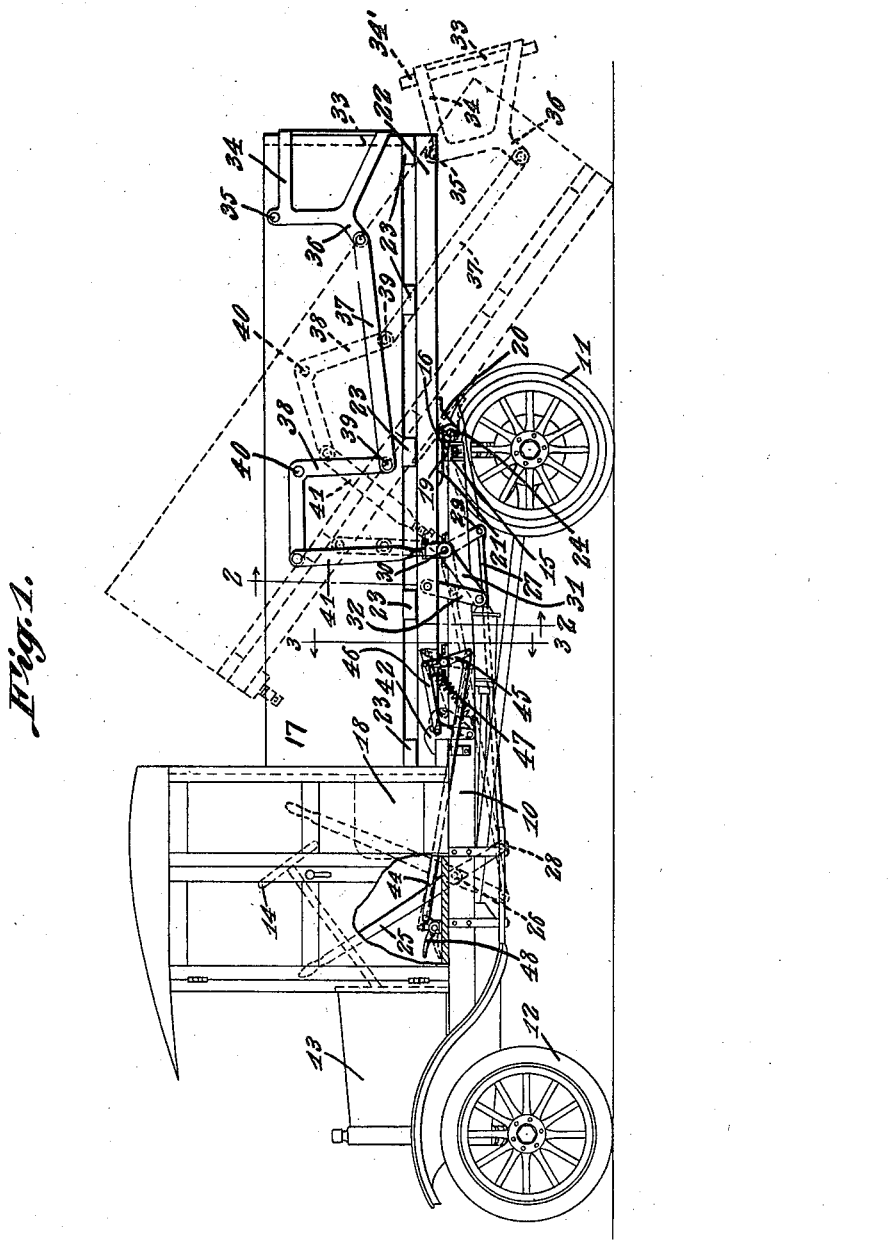
H.F. McClain, Inventor
Witness
By C.A. Snow & Co.
Attorneys Mar. 6, 1923.
H. F. McCLAIN.
DUMPING TRUCK.
FILED JUNE 7, 1920.
1,447,590.
2 SHEETS—SHEET 2.
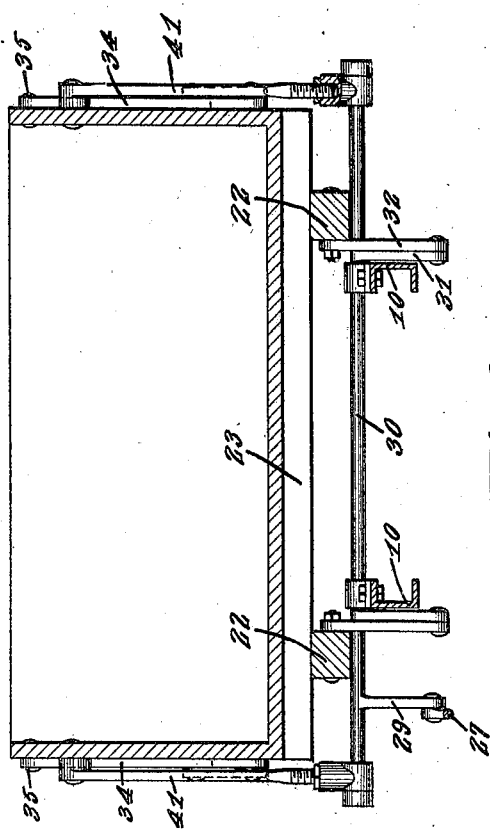
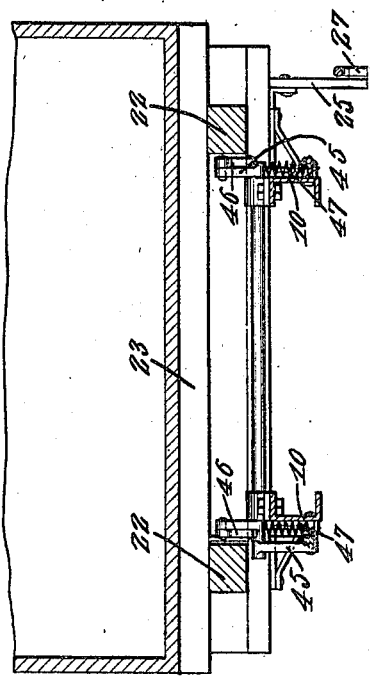
H. F. McClain, Inventor Patented Mar. 6, 1923.

1,447,590

UNITED STATES PATENT OFFICE.

HUGH F. McCLAIN, OF KANSAS CITY, MISSOURI.

DUMPING TRUCK.

Application filed June 7, 1920. Serial No. 387,213.

*To all whom it may concern:*

Be it known that I, HUGH F. MCCLAIN, a citizen of the United States, residing at Kansas City, in the county of Jackson and State of Missouri, have invented a new and useful Dumping Truck, of which the following is a specification.

This invention relates to new and useful improvements in dump trucks, and more particularly to an instantly acting lever-operated dump body adapted for use in connection with one ton truck chassis or the like, although I desire it to be understood that the invention may be adapted for other chassis, or wheeled frames.

The object of the invention is principally to provide a lever-operated dump body or grain box, for one ton Ford trucks or truck chassis or the like, and which is so mounted and actuated as to operate with the least expenditure of manual exertion and which is constructed so as to be capable of being economically produced and sold for application to the chassis of trucks, and which comprises but few parts requiring no material modification of the chassis or frame structures to which the same is applied.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 illustrates a side elevation of the dump truck constructed in accordance with the invention, the same being shown in full or solid lines in a carrying position upon the chassis frame in dotted lines, in a dumping position.

Figure 2 illustrates a sectional view taken on line 2—2 of Figure 1; and

Figure 3 illustrates a sectional view taken on line 3—3 of Figure 1.

Referring to the drawings in detail, in which like reference characters designate corresponding parts throughout the several views, there is shown an automobile chassis constituting one form of wheeled and self or otherwise propelled frame or chassis, the frame being indicated at 10 and having the propelling wheels 11 and steering wheels 12, the wheels 11 being driven from a motor housed within the hood 13 and the steering wheels being operated in the usual manner from the steering wheel 14. In the drawings, is depicted a one ton truck chassis, the frame 10 of which has the opposed side portions of the channel-shaped cross-section preferably tapering toward their rear ends, which are connected by a cross member 15 at the rear ends thereof, the member 15 being provided with an arch-shaped upwardly extending intermediate portion 16, it being understood that the truck is designed to carry its load on the rear wheels 11.

The body, bed or grain box 17 is therefore mounted at its center, that is, between its ends equi-distantly, exactly over the rear axle and is pivoted or hinged thereto for rearwardly tilting movement or for movement onto the frame in rear of the seat 18 or cab, through the medium of hinges 19 constituting means of connection between the body and the frame. These hinges comprise brackets 20, detachably or otherwise bolted to the cross member or rear end of the frame adjacent to each end thereof, that is, adjacent to the sides of the frame, and top plates 21 secured to the sills 22 extending longitudinally under the body or box 17 beneath the cross members 23, said sills being disposed near opposite sides of the bottom of the body, the body being constructed with removable top portions if desired, to increase or decrease the capacity thereof, depending upon the material to be carried.

The top plates or strips 21 are bolted or otherwise secured to the bottom faces of the sills and are provided with downward extensions forming sleeves or butts so that the hinges or pivots 24 are disposed rearwardly of the rear end of the frame, or preferably a fewer inches to the rear of the center of the box or body, to keep the latter from tilting to a dumping position when the front end is released, until ready to dump. It might be further stated that the front portion forwardly of the pivots, will be longer than the rear portions projecting beyond the frame, so that the major portion or weight will be disposed forwardly to retain the box or body in a carrying position.

In order that the body may be tilted rearwardly to cause the same to discharge its load, I have provided suitable operating means which includes an operating lever 25 which is pivotally supported within the cab, as at 26, the lever being disposed in close proximity to the operator's seat to permit of easy access thereto, so that the operator may cause the operation of the body without the necessity of leaving his seat.

The lower extremity of this operating lever 25 has connection with the rod 27 as at 28, the rod 27 having its rear end pivotally connected to the arm 29 which is carried by the shaft 30, supported on the frame 10. The arms 31 which are carried by the shaft 30 to move therewith, having connection with the arms 32, carried at opposite sides of the body and which in turn have one of their ends bolted to the sills 22.

From the foregoing it is obvious that movement of the lever 25 causes the arms 32 to move the body of the truck to dump the contents thereof or move the truck to its normal position. The end gate 33 is of the pivoted type and includes a frame indicated at 34, which supports the gate proper 34' and which is pivotally connected to the side boards of the body as at 35, portions of the frame indicated at 36, extend downwardly and have pivotal connection with the arms 37 at one of the ends thereof.

The forward extremities of the arms 37 are pivotally connected to one of the arms of the respective bell crank levers 38 as at 39, the bell crank levers being however pivotally connected to the side boards of the body as at 40, while the forward ends thereof have connection with the arms 41 which are secured to the shaft 30, so that movement of the shaft will produce a relative movement of the end gate to cause the same to move to a position to permit the discharge of the material from the body.

Secured to the frame 10, is a latch member 42, which is adapted to move over the bar 43, forming a part of the wagon body, so that the body will be maintained in a carrying position, until it is desired to dump the contents thereof, whereon the latch member is released.

The releasing mechanism for actuating the latch member 42 includes a controlling rod 44 that has pivotal connection with the arm 45, which arm has the upper end thereof connected to the latch member through the medium of the arm 46, there being provided a coiled spring 47 for urging the arm 46 forward, to insure the latch member 42 holding the body of the vehicle in a position as indicated in full lines in Figure 1.

Associated with the forward end of the controlling rod 44, is a pedal 48, which is pivotally supported on the floor of the body, adjacent to the operator's seat whereby the operator may control the dumping operation by movement of the pedal 48 to cause the latch member 42 to release or disengage the body.

The operation of the device is as follows:—

Assuming that the body is in a carrying position, and it is desired to dump the contents thereof, the lever 25 is moved from the position as indicated in full lines in Figure 1 of the drawings, to the position as indicated in dotted lines in Figure 1 of the drawings, the pedal 48 however having been operated to release the body. It follows that the weight of the contents of the body together with the pressure exerted on the lever 25, causes the body to move rearwardly to a position as indicated by the dotted lines in Figure 1 of the drawings, the end gate 34' moving simultaneously to an open position, to permit the contents of the body to discharge.

Upon movement of the operating lever 25 in the opposite direction, the wagon body is again moved to its normal position and locked in such position by the latch member 42.

Having thus described the invention, what is claimed as new is:—

1. The combination with a wheeled frame of a body hinged to the rear portion thereof, a bell crank lever pivotally supported on the body, an endgate including a pivoted frame having arms extending therefrom, connecting arms connecting the bell crank lever and endgate frame, a shaft supported by the wheeled frame and extending transversely thereof, an arm having connection with the shaft, a rod having connection with the arm to move the shaft, means for moving the rod, and means for connecting the shaft and bell crank lever to operate the same for tilting the body.

2. The combination with a wheeled frame, of a body hinged thereto, a bell crank lever pivotally connected to the body, a frame pivotally supported adjacent to the rear of the body and carrying an endgate, an arm connecting the frame and bell crank lever, means having connection with the bell crank lever and having connection with the wheeled frame for moving the endgate supporting frame, when the body is moved, and means for manually moving the bell crank lever to operate the endgate frame.

In testimony that I claim the foregoing as my own, I have hereto affixed my signature in the presence of two witnesses.

HUGH F. McCLAIN.

Witnesses:
 CHAS. E. LAWRENCE,
 W. R. B. MILLER.